United States Patent [19]

Rosenthal

[11] 4,433,878

[45] Feb. 28, 1984

[54] SELF-ALIGNING BEARING ASSEMBLY

[75] Inventor: Ben J. Rosenthal, Wilmette, Ill.

[73] Assignee: Rosenthal Manufacturing Co., Inc., Chicago, Ill.

[21] Appl. No.: 428,370

[22] Filed: Sep. 29, 1982

[51] Int. Cl.³ .................. F16C 13/00; F16C 35/00; F16J 1/14

[52] U.S. Cl. .................. 308/203; 308/2 R; 384/434

[58] Field of Search .............. 308/203, 204, 2 R; 384/192, 434

[56] References Cited

U.S. PATENT DOCUMENTS

| | | | |
|---|---|---|---|
| 843,591 | 2/1907 | Edwards | 384/218 |
| 2,115,579 | 4/1938 | Hannaford | 384/434 |
| 2,399,189 | 4/1946 | Johnson | 308/203 |
| 2,399,446 | 4/1946 | Morgan, Jr. | 308/203 |
| 2,430,487 | 11/1947 | Wessenger | 308/203 |
| 2,738,240 | 3/1956 | Parsons | 384/202 |
| 2,926,974 | 3/1960 | Anderson et al. | 308/203 |
| 2,947,580 | 8/1960 | Fisher | 308/203 |
| 3,295,801 | 1/1967 | McDowall et al. | 308/204 X |
| 4,160,569 | 7/1979 | Reid | 308/203 |
| 4,222,704 | 9/1980 | Reid | 308/203 X |

Primary Examiner—Stuart S. Levy
Assistant Examiner—Thomas R. Hannon
Attorney, Agent, or Firm—Neuman, Williams, Anderson & Olson

[57] ABSTRACT

A self-aligning bearing assembly for engaging, supporting, and permitting the free rotation of, the end of a load bearing shaft, the bearing assembly comprising a sub-base, a supporting sub-assembly, and alignment apparatus, such as an alignment shaft with damping members, operatively engaging and disposed between the sub-base and the supporting sub-assembly. The shaft end is supported by roller means located in the supporting sub-assembly. An upper sub-assembly having upper roller means is preferrably provided to maintain the load bearing shaft in contact with the roller means of the supporting sub-assembly. The upper sub-assembly may be hinged to the supporting sub-assembly to facilitate the ready placement and removal of the shaft from the assembly.

7 Claims, 3 Drawing Figures

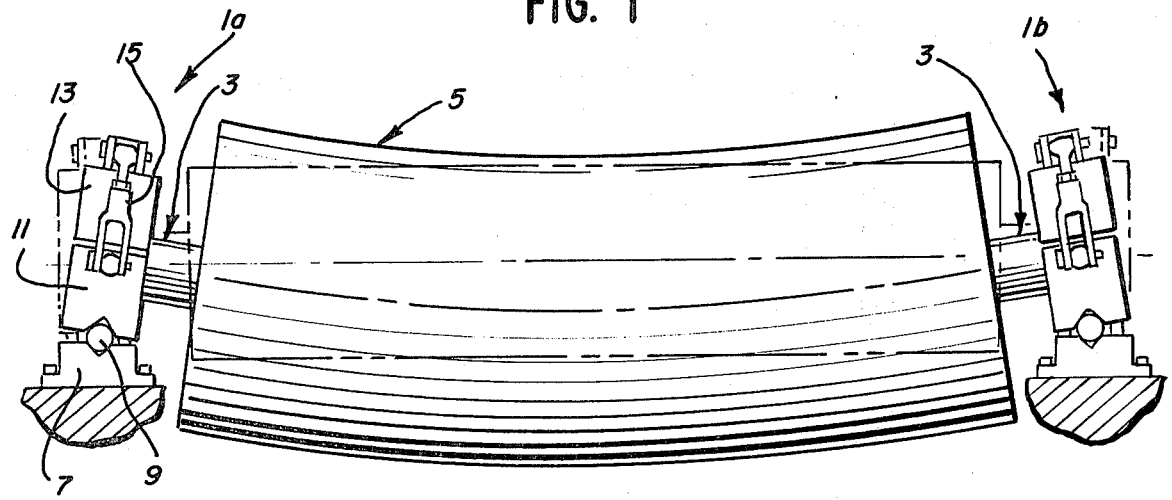
FIG. 1
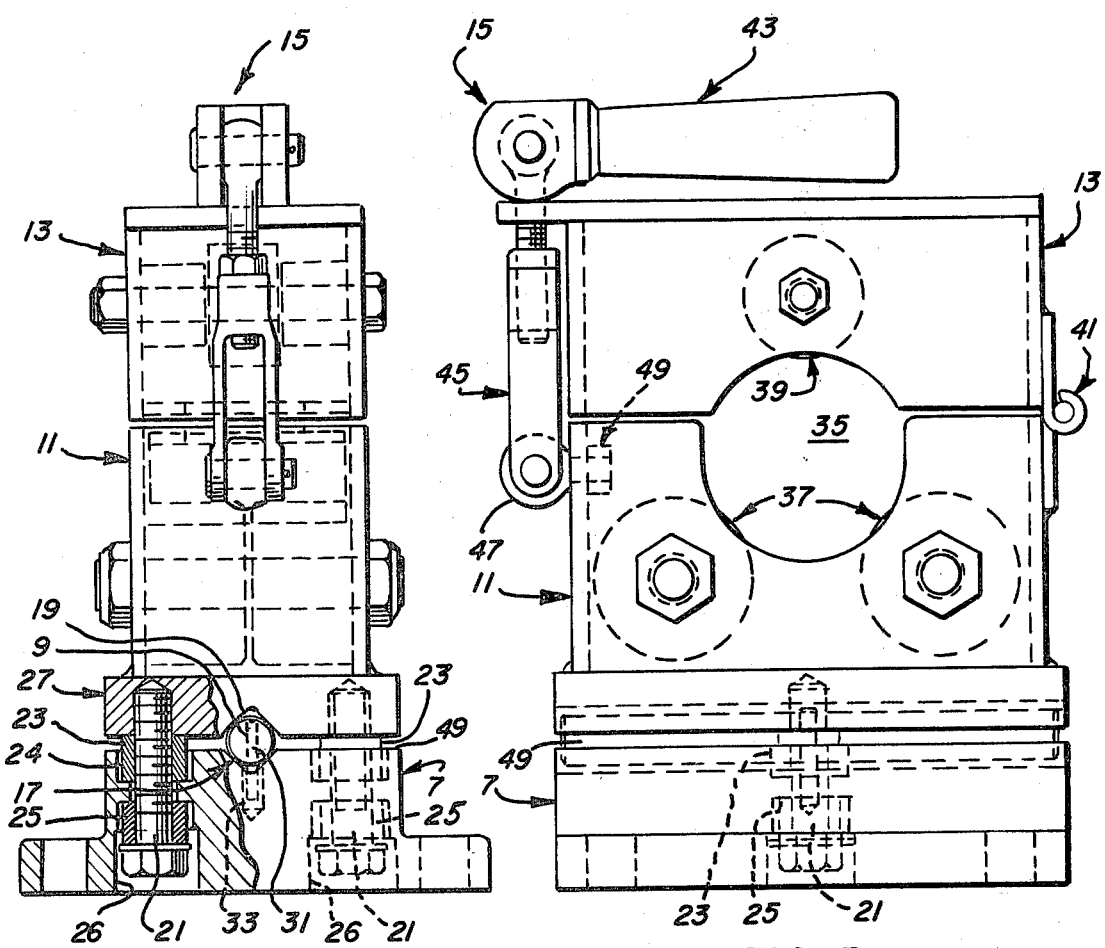
FIG. 2
FIG. 3

SELF-ALIGNING BEARING ASSEMBLY

BACKGROUND OF THE INVENTION

1. Field of the Invention

The present invention is a self-aligning bearing assembly for engaging and supporting, while permitting the free rotation of, the end of a load bearing shaft. The present invention employs supporting cam rollers in parallel relationship to the axis of the end of the shaft, and maintains the parallel relationship despite variations in the load carried by the shaft. Means for facilitating the easy placement and removal of the shaft from the assembly are also preferably provided. The invention is especially useful in industries where large rolls of paper or metal sheet material is unwound from or wound onto a supporting shaft.

2. Description of the Prior Art

The prior art teaches various assemblies for engaging and supporting, while permitting the free rotation of, a load bearing shaft. Frequently, however, the load carried by the supported shaft is variable. For example, where the shaft supports a roll of paper which is being unwound, the load on the shaft is substantially greater at the beginning than at the end of the unwinding procedure. Of course, the greater the load on the shaft, the more the shaft deflects. Accordingly at the ends of its axis, the shaft deflects angularly from the normal, unloaded axis of the shaft. The amount of the angular deflection of the shaft is dependent on several factors, including the load on the shaft, the stiffness of the material of which the shaft is made, and the dimensions of the shaft and particularly the distance between the supports for the shaft. Thus, the angular deflection at the end of the shaft, where the bearing assemblies which support the shaft are often located, frequently varies.

It is desirable to maintain the bearing assemblies in a prescribed and aligned relationship to the end of the shaft. Where a plurality of cam rollers is used in the bearing assembly to support and engage the shaft end, it is desirable to maintain the surface of each cam roller in parallel relationship to the axis of the end of the shaft. Maintenance of such a parallel relationship is desirable so that the load delivered by the end of the shaft is evenly distributed along the surface of each of the cam rollers, thereby minimizing wear on both the shaft end and the cam rollers. Although it is possible to manually adjust the relationship between the shaft end and the supporting cam rollers, where the shaft end is subject to various angular deflections such manual adjustment is impractical or at least very time consuming. Accordingly, it is desirable to have a bearing assembly which automatically adjusts to properly align the cam rollers to the shaft end. In addition, it is also desirable that the bearing assembly be provided with means to facilitate quick and easy placement of the shaft end into, and removal from, the bearing assembly.

The bearing assembly must, of course, be able to withstand a variety of both static and dynamic loads. Where the bearing assembly is to include a self-alignment mechanism, that mechanism must also be of sufficient strength to withstand such loads. Additionally, it is desirable that the self-alignment mechanism have a minimum of moving parts and assemblies so that the reliability of such a mechanism will be maximized while the cost of its manufacture and maintenance are minimized.

OBJECTS OF THE INVENTION

It is a general object of the present invention to provide an improved bearing assembly of the type described which overcomes the problems associated with the prior art.

It is a further object of this invention to provide a self-aligning bearing assembly having cam rollers for engaging and supporting, while permitting the free rotation of, a load bearing shaft.

It is a further object of the present invention to provide a bearing assembly which automatically adjusts itself so that the surfaces of its cam rollers are in parallel alignment to the axis of the end of the shaft which it supports, regardless of the load carried by the shaft and the angular deflection of its end.

It is a further object of the present invention to provide a bearing assembly which is self-aligning to the end of a load bearing shaft, and which has a minimum of moving parts so as to minimize wear and maximize strength.

It is a further object of the present invention to provide a bearing assembly which permits quick and easy placement of the end of a load bearing shaft into, and removal from, the bearing assembly.

Other objects and advantages of the invention will become apparent upon reading the following summary of the invention, the detailed description and the appended claims, and upon reference to the accompanying drawings.

SUMMARY OF THE INVENTION

In accordance with one embodiment of the invention, a self-aligning bearing assembly has a sub-base, a supporting sub-assembly thereabove, an upper sub-assembly located above the supporting sub-assembly, alignment means located between the sub-base and supporting sub-assembly, and locking means for securing the upper sub-assembly to the supporting sub-assembly. When in a locked position, the supporting and upper sub-assemblies form an annular opening. It is this opening into which the cylindrical end of a load bearing shaft is placed and secured.

The shaft end is supported on and engaged by four cylindrical supporting cam rollers which are mounted in the supporting sub-assembly. A single cylindrical upper cam roller is also mounted within the upper sub-assembly. When the bearing assembly is in a closed position, the upper cam roller engages the shaft end to keep it from jumping off the supporting cam rollers. The placement of shafts into and their removal from the bearing assembly is conveniently facilitated by hinging the upper sub-assembly to the supporting sub-assembly. It will be appreciated by those skilled in the art, however, that the upper sub-assembly and locking means are not essential to all embodiments of the present invention.

Under load, the axis of the end of the shaft will deflect by some angular amount from the normal, unloaded axis of the shaft. To keep the load on the supporting cam rollers evenly distributed the sub-assemblies of the present invention tilt together as a single unit, in relation to the sub-base, by an amount equal to the angular deflection of the shaft end. This tilting is accomplished by means of an alignment shaft which is located in V-shaped channels which run the length of the top of the sub-base and the bottom of the supporting sub-assembly. The alignment shaft is held in place in these V-shaped channels by the weight of the sub-assemblies and by a pin which passes through the alignment shaft to the sub-base.

The load carried by the supporting sub-assembly is transferred directly to the sub-base by the aforementioned alignment shaft. Two stabilizer screws straddle the alignment shaft. The stabilizer screws are each supplied with two bushings made of a compressible, resilient material, such as rubber, so as not to interfere with the free rotation of the sub-assemblies about the alignment shaft. The bushings also serve the purpose of damping the vibrations associated with the rotation of the load bearing shaft.

BRIEF DESCRIPTION OF THE DRAWINGS

For a more complete understanding of this invention reference should now be made to the embodiment illustrated in greater detail in the accompanying drawings and described below by way of an example of the invention. In the drawings:

FIG. 1 is a side elevation view of a pair of self-aligning bearing assemblies of the present invention installed for use in supporting a load-bearing shaft wherein the solid lines show the relative position of the present invention to the shaft ends when the shaft is under load, and the phantom lines show the relative position of the present invention when the shaft is not under load.

FIG. 2 is a left side elevation view of one embodiment of the present invention with the lower left corner of the invention partially cut away; and FIG. 3 is a front elevation view of one embodiment of the present invention.

It should be understood that the drawings are not necessarily to scale. In certain instances, details which are not necessary for an understanding of the present invention or which render other details difficult to perceive may have been omitted. It should be understood, of course, that the invention is not necessarily limited to the particular embodiment illustrated herein.

DETAILED DESCRIPTION OF THE DRAWINGS INCLUDING PREFERRED EMBODIMENTS

Turning first to FIG. 1, two self-aligning bearing assemblies 1a and 1b of the present invention are shown engaging and supporting a load-bearing shaft 3. The solid lines in FIG. 1 indicate the position of the self-aligning bearing assemblies 1a and 1b when the shaft 3 is supporting a load 5, for example a load of paper or sheet metal which has been wound onto the shaft. The phantom lines shown in FIG. 1 represent the relative position of the self-aligning bearing assemblies when the shaft 3 is not under load. With reference to the left-hand self-aligning bearing assembly 1a shown in FIG. 1, it can be seen that it comprises a sub-base 7, an alignment shaft 9, a supporting sub-assembly 11, an upper sub-assembly 13, and locking means 15 for securing the upper sub-assembly 13 to the lower sub-assembly 11 while securely supporting the end of the shaft 3. The alignment shaft 9 is located between the top of the sub-base 7 and the bottom of the supporting sub-assembly 11 as shown. A lower channel 17 is formed in the sub-base 7 and an upper channel 19 is formed in the supporting sub-assembly 11. The alignment shaft, in combination with channel 19 in the top of the sub-base 7 and channel 17 in the bottom of the supporting sub-assembly 11, provides alignment means whereby the self-aligning bearing assemblies, and in particular the supporting sub-assembly 11, can tilt in relation to the sub-base 7 in response to an angular deflection of the end of the shaft 3. The angular deflection at the end of shaft 3 is caused by the load 5 placed on such shaft. By permitting the upper and supporting sub-assemblies to tilt by an amount substantially equal to said angular deflection, the wear on the end of the load bearing shaft 3, as well as the wear on the constituent parts of the sub-assemblies is minimized.

A more detailed appreciation of one embodiment of the present invention now can be obtained by reference to FIGS. 2 and 3, FIG. 2 being a left-side elevation view of the present invention with the lower corner of the invention partially cut away, and FIG. 3 being a front elevation view of the present invention. As best shown in FIG. 2, the alignment means are disposed between the sub-base 7 and the supporting sub-assembly 11 and comprise an alignment shaft 9 located in V-shaped channels 17 and 19, stabilizing members 21, and upper and lower bushings 23 and 25, said bushings being made of a compressible, resilient material, such as rubber. The stabilizing members 21 may, as shown, be screws which are threaded into the bearing plate 27 of the supporting sub-assembly 11, but it is important that they not be in threaded engagement with the sub-base 7. Rather, the stabilizing screws 21 are permitted to move up and down in relation to sub-base 7 as required by the tilting or angular deflection of the supporting sub-assembly 11 about the alignment shaft 9. As shown, the lower bushings 25 are located circumferentially about the shaft portion of the stabilizing screws 21 and between the head of said screws and the sub-base 7. The lower bushings 25 may conveniently be located in lower recesses 26 of the sub-base 7. Similarly, the upper bushings 23 are also circumferentially located about the shaft portion of the stabilizing screws 21 and between the bearing plate 27 and the sub-base 7. Again, upper recesses 24 may be provided in sub-base 7 for convenient receipt of the upper bushings 23. Thus, when the supporting sub-assembly 11 tilts, one of the lower bushings 25 is compressed between the sub-base 7 and the head of the stabilizing screw 21, and the upper bushing 23 of the opposite stabilizing screw 21 is compressed between the bottom of the bearing plate 27 and the sub-base 7. Such compression of said bushings does not interfere with the angular movement of the supporting sub-assembly 11, but does serve to aid in minimizing and damping any erratic angular movements or vibrations. Moreover, the upper bushings 23 also serve to help transfer some of the load carried by the supporting sub-assembly 11 to the sub-base 7.

Despite the benefit of the damping action provided by the resilient upper and lower bushings, however, vibrations and the angular movement of the supporting sub-assembly 11 may cause alignment shaft 9 to work itself out from between the bearing plate 27 and sub-base 7. To prevent this from occurring, the alignment shaft 9 is preferably, though not essentially, secured to the sub-base 7 by passing a pin 31 through an opening in the alignment shaft 9 and into a bore hole 33 in the sub-base 7.

Referring now to FIG. 3, it can be seen that a circular opening 35 is formed by the supporting sub-assembly and the upper sub-assembly when the upper sub-assembly is in a closed position. The end of the load-bearing shaft 3 is conveniently placed into this opening 35 and supported on roller means such as lower cam rollers 37 of the supporting sub-assembly 11. A roller means such as upper cam roller 39 is also preferably provided in the upper sub-assembly 13 to assist in preventing the end of the load bearing shaft 3 from bouncing or jumping off the lower cam rollers 37. As also shown in FIG. 3, the stabilizing screws 21, and the upper and lower bushings 23 and 25 are, in this embodiment of the invention centrally located, that is, directly beneath the center line or axis of the load bearing shaft. However, it will readily be appreciated by those of ordinary skill in the art having the benefit of this disclosure that the present invention is not necessarily limited to an embodiment having two stabilizing screws as shown. Alternatively, two or more pairs of stabilizing screws could be provided, for example, a pair of stabilizing screws could be provided beneath the center line of the left cam roller 37 and another pair of stabilizer screws could be located beneath the right cam roller 37.

For convenient placement of the shaft 3 in the circular opening 35 and its securement therein, the present invention is provided with a hinge 41 and locking means 15. Thus, by rotating the cam lock lever 43 shown in FIG. 3 counterclockwise, linkage arm 45 is lowered into a position which permits stud 47 to disengage bore 49 of the supporting sub-assembly 11. After such disengagement, the upper sub-assembly 13 can be conveniently rotated about hinge 41, the end of load bearing shaft 3 may be placed on top of lower cam rollers 37, and then secured within the self-aligning bearing assembly by simply closing the upper sub-assembly and then securing it to the lower sub-assembly by use of the locking means 15. For removal of the shaft from the bearing assembly, the procedure is simply reversed.

From the above description, it is apparent that the objects of the present invention have been achieved. While only certain embodiments have been set forth, alternative embodiments and various modifications will be apparent from the above description to those skilled in the art. For example, while the embodiments described are shown with V-shaped channels located above and below the alignment shaft, it will be appreciated that the present invention is not necessarily limited to such embodiments. Thus, U-shaped or semicircular channels may be provided, and the channels may include roller or needle bearings therein. It will also be appreciated that embodiments having a different number of cam rollers in the upper or supporting sub-assemblies is also within the scope of the present invention.

Having described the invention, what is claimed is:

1. A self-aligning bearing assembly for engaging, supporting, and permitting the free rotation of, the end of a load bearing shaft, said self-aligning bearing assembly comprising:
    a sub-base having a top and a bottom;
    a supporting sub-assembly being located above said sub-base, said supporting sub-assembly having a base and roller means for supporting the end of said load bearing shaft and permitting the free rotation thereof;
    alignment means operatively engaging and disposed between the top of said sub-base and the base of said supporting sub-assembly for directly transferring the load supported by said supporting sub-assembly to said sub-base while permitting said supporting sub-assembly to tilt in relation to said sub-base;
    said alignment means comprising a pair of parallel, juxtaposed channels, the first one of said channels located in the base of said supporting sub-assembly and having its axis normal to the axis of said load bearing shaft, and the second one of said channels located in the top of said sub-base, and an alignment shaft located within and between said channels; and
    said alignment means further comprising at least two stabilizing members, said stabilizing members fixedly attached to said base of said supporting sub-assembly, one each of said stabilizing members attached to said base on each side of said channels, each of said stabilizing members further having damping means for operatively connecting each of said stabilizing members to said sub-base whereby tilting of the supporting sub-assembly in relation to said sub-base is damped.

2. A self-aligning bearing assembly as set forth in claim 1 wherein said stabilizing members comprise stabilizing screws each having a threaded end, a head, and shaft portion therebetween, said threaded end being threaded into the base of said supporting sub-assembly, said shaft portion being disposed in said sub-base and in non-engagement therewith to permit movement of said stabilizing screws relative to said sub-base.

3. A self-aligning bearing assembly as set forth in claim 2 wherein the damping means comprise upper bushings and lower bushings made of a compressible, resilient material, said upper bushings located circumferentially about the shaft portion of said stabilizing screws and between the top of said sub-base and the base of said supporting sub-assembly, and said lower bushings located circumferentially about the shaft portion of said stabilizing screws and between the head of said stabilizing screws and the bottom of said sub-base.

4. A self-aligning bearing assembly as set forth in claim 3 wherein said sub-base further comprises upper recesses and lower recesses, said upper recesses for receiving said upper bushings while maintaining at least a portion of said upper bushings above the top of said sub-base, and said lower recesses for receiving said lower bushings and the head of said stabilizing screws while maintaining the head above the bottom of said sub-base.

5. A self-aligning bearing assembly as set forth in claim 1, 2, 3 or 4 further comprising an upper sub-assembly operatively connected to said supporting sub-assembly, said upper sub-assembly having upper roller means for maintaining said load bearing shaft in contact with the roller means of said supporting sub-assembly.

6. A self-aligning bearing assembly as set forth in claim 5 further comprising locking means for securing said upper sub-assembly to said supporting sub-assembly and thereby securing the end of said load bearing shaft therebetween and for permitting the disengagement of said upper sub-assembly from said supporting sub-assembly for the placement or removal of the end of said load bearing shaft from said bearing assembly.

7. A self-aligning bearing assembly as set forth in claim 1, 2, 3 or 4 wherein said alignment shaft is secured to said sub-base with securement means comprising a pin located in said alignment shaft and engaging a bore hole in said sub-base.

* * * * *